United States Patent
Martin

(10) Patent No.: US 11,313,297 B2
(45) Date of Patent: Apr. 26, 2022

(54) SYNCHRONOUS REAL TIME DYNAMOMETER AND CONTROL SYSTEM

(71) Applicant: Combustion Order Ltd, Essex (GB)

(72) Inventor: Peter Martin, Essex (GB)

(73) Assignee: Combustion Order Ltd

(*) Notice: Subject to any disclaimer, the term of this patent is extended or adjusted under 35 U.S.C. 154(b) by 0 days.

(21) Appl. No.: 17/263,344

(22) PCT Filed: Jul. 29, 2019

(86) PCT No.: PCT/GB2019/000108
§ 371 (c)(1),
(2) Date: Jan. 26, 2021

(87) PCT Pub. No.: WO2020/025915
PCT Pub. Date: Feb. 6, 2020

(65) Prior Publication Data
US 2021/0215109 A1    Jul. 15, 2021

(30) Foreign Application Priority Data

Aug. 1, 2018   (GB) .................................. 1812574
Feb. 22, 2019  (GB) .................................. 1902410

(51) Int. Cl.
*F02D 41/00* (2006.01)
*F02B 63/04* (2006.01)
(Continued)

(52) U.S. Cl.
CPC .......... *F02D 41/009* (2013.01); *F02B 63/042* (2013.01); *F02D 29/06* (2013.01);
(Continued)

(58) Field of Classification Search
CPC ........ F02D 41/00; F02D 41/009; F02D 41/14; F02D 29/06; F02D 33/00;
(Continued)

(56) References Cited

U.S. PATENT DOCUMENTS 5,056,487 A    10/1991  Yamakado
2009/0118967 A1*  5/2009  Kaiser ................. F02D 41/1497
                                              701/102
(Continued)

FOREIGN PATENT DOCUMENTS

CN   106370429   7/2018
EP   3067681     9/2016

OTHER PUBLICATIONS

Dr. Horizon Gitano-Briggs, "Dynamometry and Testing of Internal Combustion Engines Seminar"; Dynamometry and Testing of Internal Combustion Engines Seminar, Jun. 26, 2008, University Science Malaysia, Penang, Malaysia; pp. 15, 65-69. Retrieved from the Internet on Oct. 29, 2019 at URL: https://www.academia.edu/4784086/Dynamometry_and_Testing_of_Internal_Combustion_Engines_Seminar.

(Continued)

*Primary Examiner* — John Kwon
*Assistant Examiner* — Johnny H Hoang
(74) *Attorney, Agent, or Firm* — Keusey & Associates, P.C.

(57) ABSTRACT

A synchronous dynamometer assembly for applying a load to an engine during at least one portion of the combustion cycle of the engine in a synchronised manner so as to be repeatable each cycle of the engine comprises a dynamometer having a non-inductive load which is applied to the engine during operation to vary the speed of the engine. The non-inductive load is variable by varying the current delivered to it. Crankshaft monitoring means monitors the rotational position of the engine crankshaft, and combustion detection means detects a combustion event in a cylinder of the engine. Control means is operatively connected to the dynamometer for applying the load from the dynamometer to the engine for at least one part of the combustion cycle in (Continued)

real time such that the different loads may be applied to the engine for different parts of the combustion cycle.

30 Claims, 5 Drawing Sheets

(51) Int. Cl.
*F02D 29/06* (2006.01)
*F02D 33/00* (2006.01)
*G01M 15/02* (2006.01)
*G01M 15/05* (2006.01)
*G01M 15/06* (2006.01)
*G01M 15/08* (2006.01)

(52) U.S. Cl.
CPC .............. *F02D 33/00* (2013.01); *G01M 15/02* (2013.01); *G01M 15/05* (2013.01); *G01M 15/06* (2013.01); *G01M 15/08* (2013.01); *F02D 2200/023* (2013.01); *F02D 2200/024* (2013.01)

(58) Field of Classification Search
CPC ......... F02D 2200/023; F02D 2200/024; F02B 63/04; F02B 63/042; F02B 63/75; G01M 15/02; G01M 15/05; G01M 15/06; G01M 15/08
USPC ......... 701/102–105, 110–115; 123/435, 436, 123/481
See application file for complete search history.

(56) References Cited

U.S. PATENT DOCUMENTS

| | | | |
|---|---|---|---|
| 2010/0100299 A1* | 4/2010 | Tripathi | F02P 5/1512 701/102 |
| 2011/0213540 A1* | 9/2011 | Tripathi | F02D 41/266 701/102 |
| 2015/0275806 A1* | 10/2015 | Genslak | F02D 28/00 701/104 |
| 2016/0131061 A1* | 5/2016 | Whitney | F02D 41/0077 701/108 |

OTHER PUBLICATIONS

W.J. Wang, "Engine Testing and Instrumentation" Engine Testing and Instrumentation 2008-09 Course Material, Department of Engineering & Design, University of Sussex, Falmer, Brighton, BN1 9QT ; pp. 74-126. Retrieved from the Internet on Oct. 29, 2019 at URL: http://users.sussex.ac.uk/~tafb8/eti/eti_03_EngineTestingOverview.pdf.
R. Chen, E. Winward, P. Stewart, B. Taylor, D. Gladwin, "Quasi-Constant Volume (QCV) Spark Ignition Combustion"; SAE Technical Paper 2009-01-0700, 2009 SAE World Congress Exhibition; pp. 1-10; published Apr. 20, 2009 by SAE International in United States; ISSN: 0148-7191, e-ISSN: 2688-3627; Downloaded from SAE International by Loughborough University, Thursday, Jan. 31, 2019.
International Search Report from European Patent Office in PCT/GB2019/000108 dated Jul. 11, 2019.
IPRP from European Patent Office in PCT/GB2019/000108 dated Jun. 2, 2020.

* cited by examiner

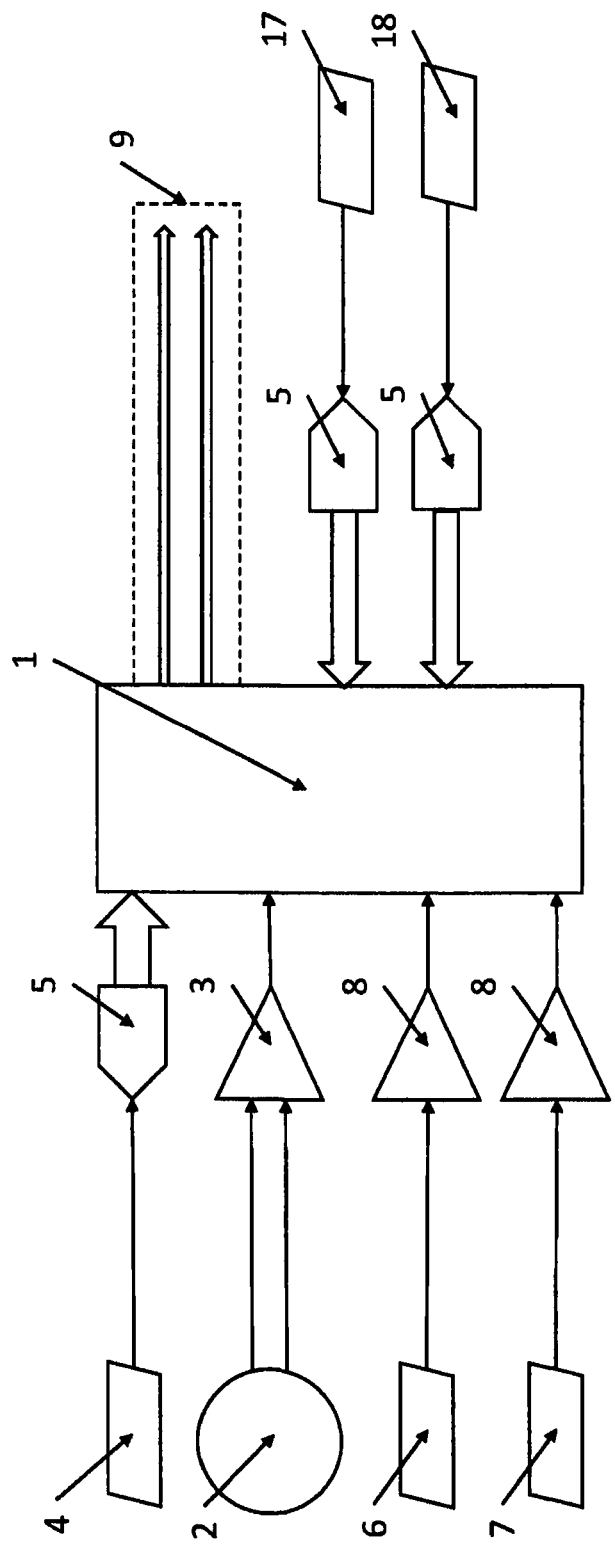
FIGURE 1 – CONTROL SYSTEM

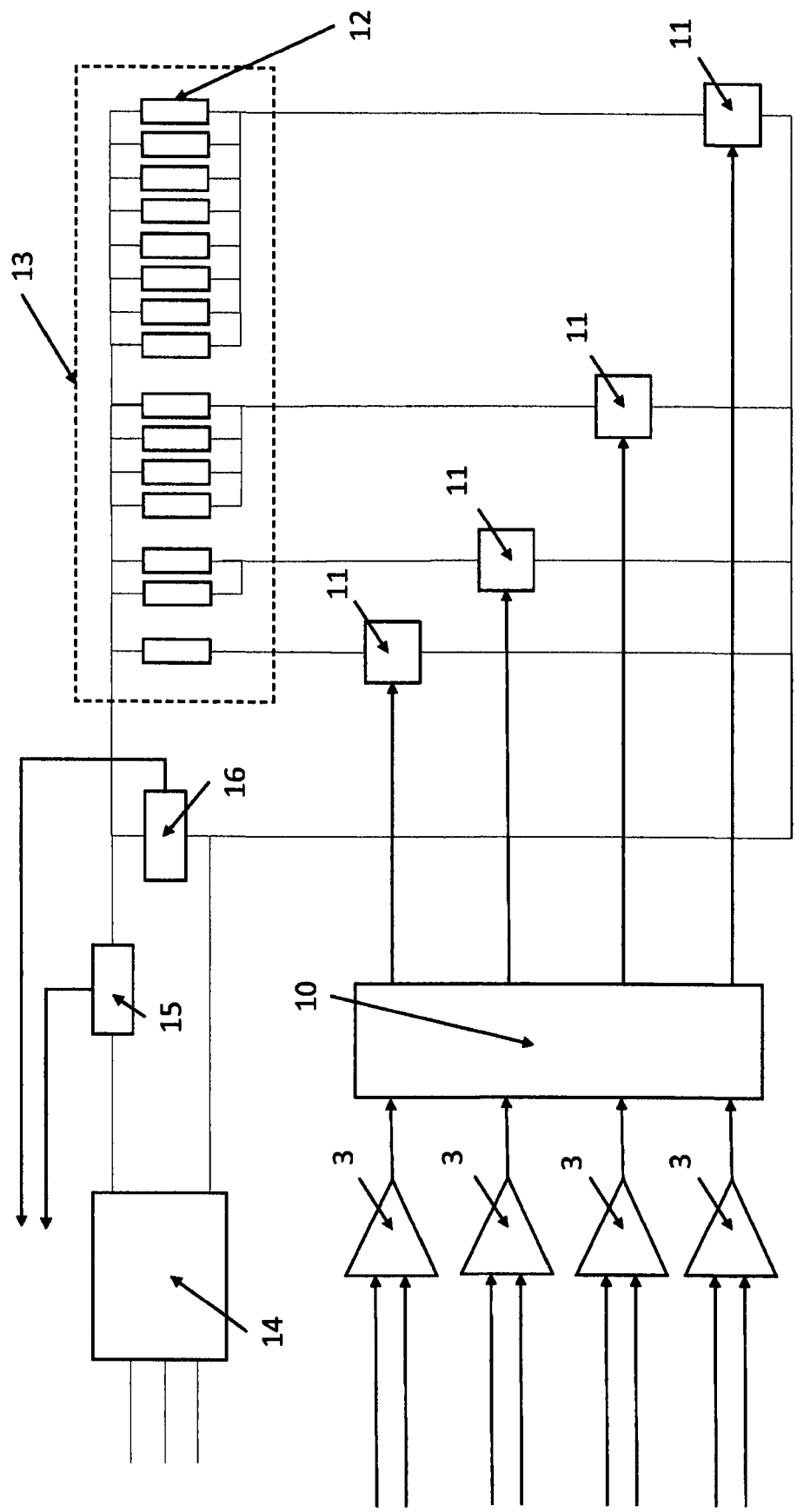

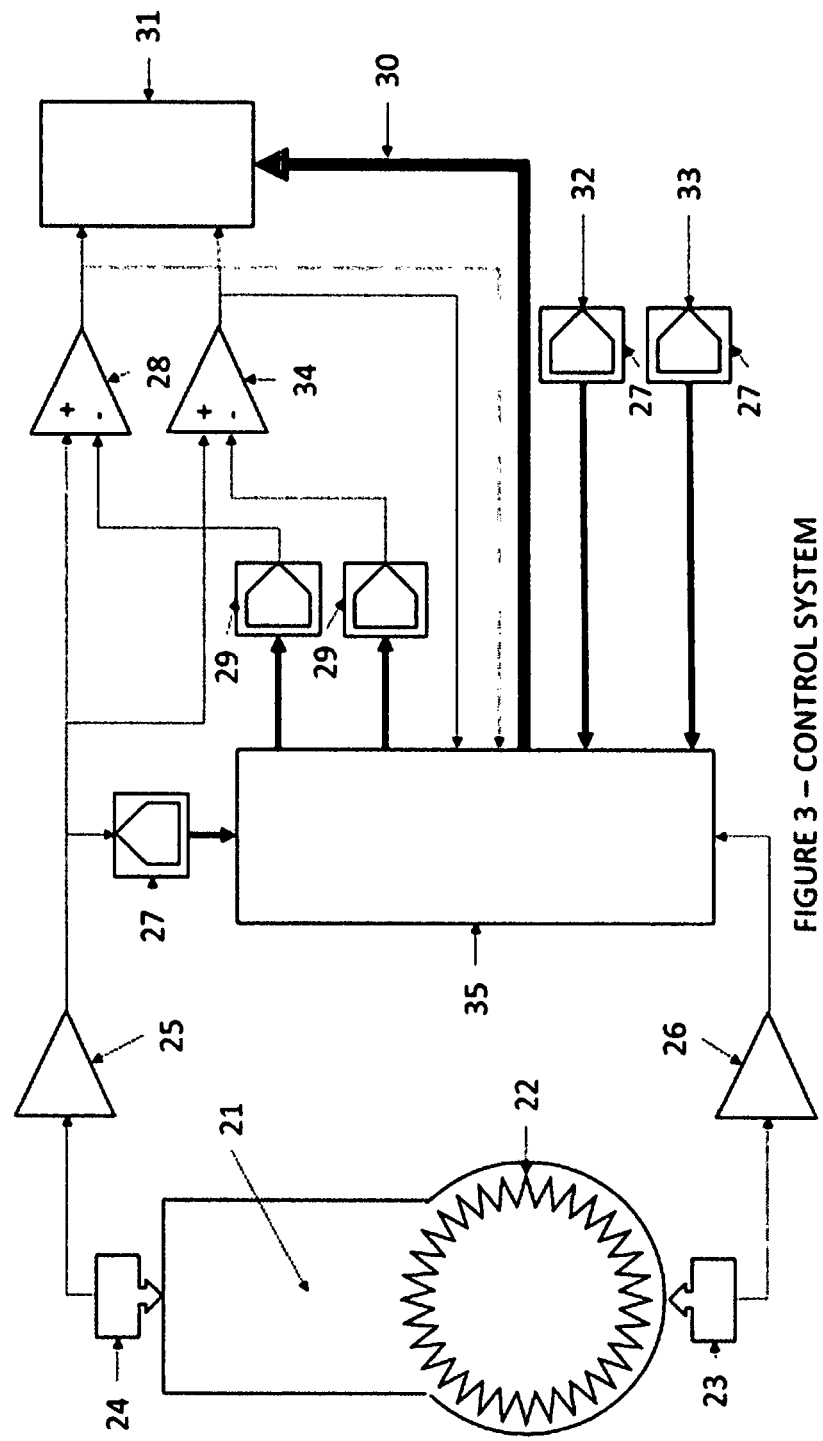
FIGURE 3 – CONTROL SYSTEM

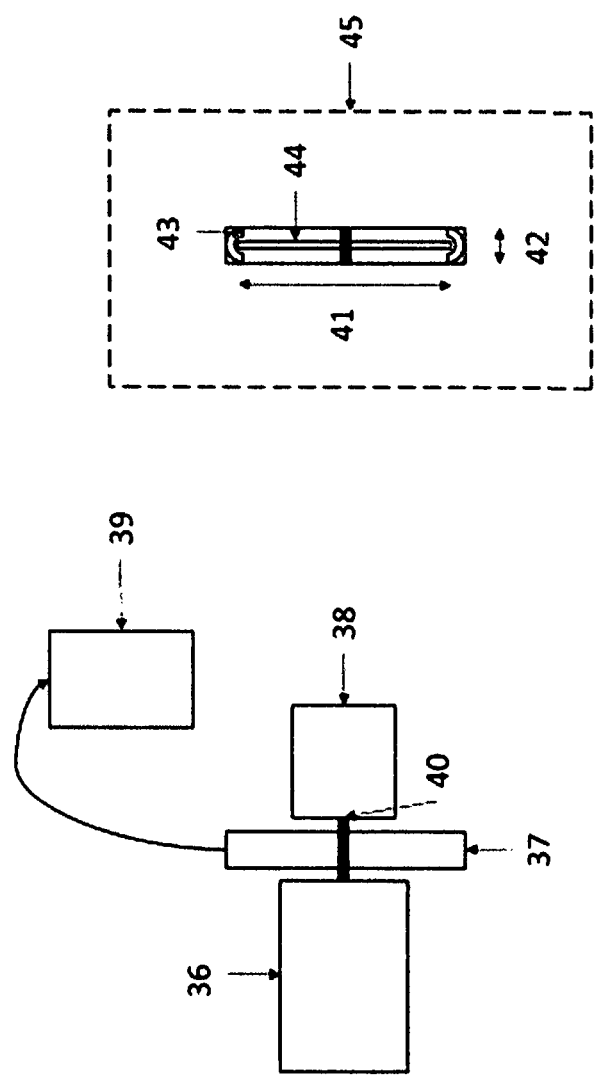

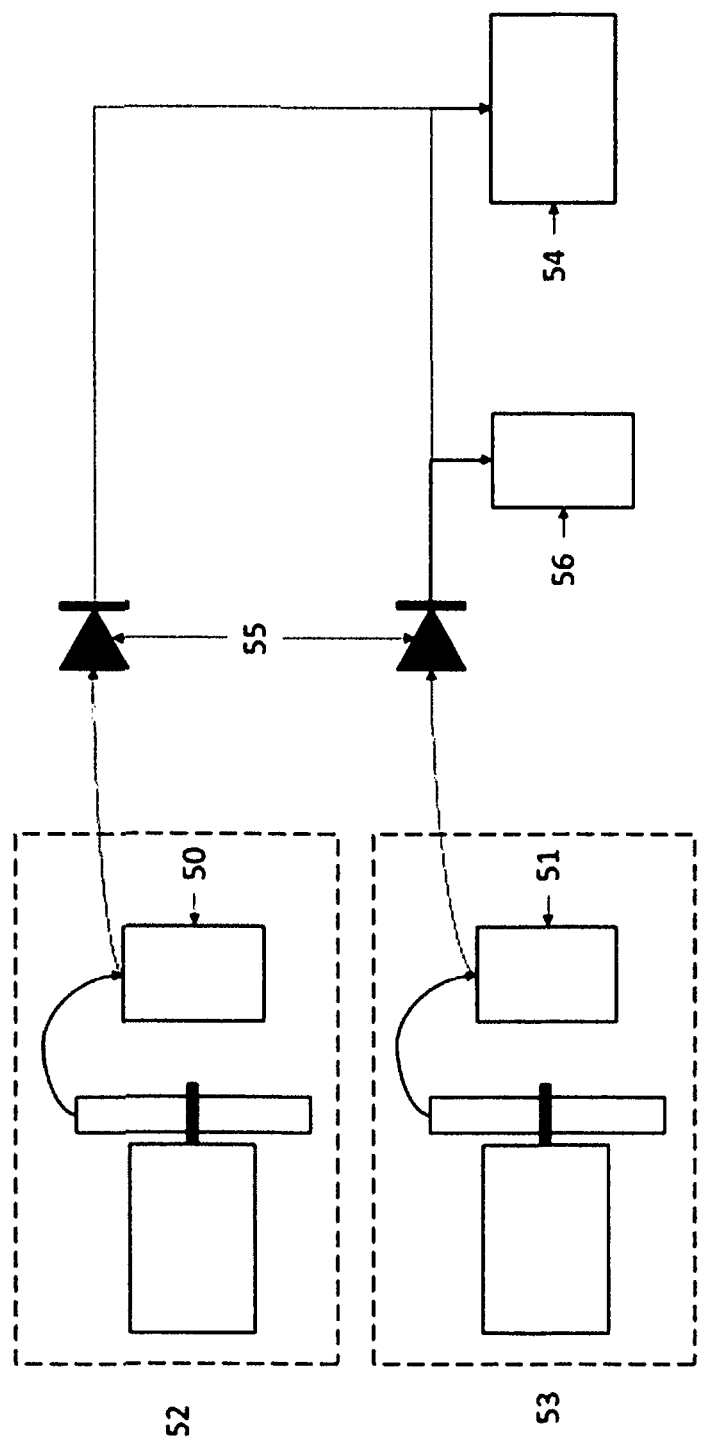
FIGURE 5 – MODULAR POWER SYSTEM

SYNCHRONOUS REAL TIME DYNAMOMETER AND CONTROL SYSTEM

BACKGROUND OF THE INVENTION

1. Field of the Invention

The present invention relates to dynamometers, and more particularly to dynamometers whose operation is synchronised with the rotational position of an engine to which it is connected, and with combustion events of the engine, and whose load can be applied or changed within several microseconds, so as to be sufficiently fast to allow the load to be varied and applied within a combustion cycle.

2. The Prior Art

Dynamometers are well known in the field of engine testing. They allow the torque and power output of the engine to be measured under controlled conditions. This is necessary for determining the performance and efficiency of the engine. The dynamometer is used to apply a controlled load to the engine. Controlling the engine power and the dynamometer load independently allows a number of test scenarios to be implemented.

Dynamometers are currently widely used in the automotive sector for engine calibration. This refers to the techniques used to set up the inputs to the engine (e.g. Fuel, air, ignition timing etc.) to achieve the desired result for a particular operational state of the engine. The inputs to the engine are usually managed by an electronic control unit (ECU) which implements the control strategy for the engine. Operation The implementation of the dynamometer load depends on the application and design of the dynamometer. Common types include;
Water brake—water is pumped by an impeller.
Brake—friction material bears upon a rotating surface.
Electric Motor/Generator—generation of electrical power provides the load to the engine.
The motor unit can additionally be used to rotate the engine to measure losses when it is unpowered, or speed up the engine when it is powered, for example to simulate freewheeling or the effect of additional cylinders when testing using a single cylinder engine.
Hydraulic break—the creation of hydraulic pressure using a pump and the distribution and control of that pressure to vary the applied load. Can also be used to drive the engine as in the case of the Motor/generator using stored pressure.
Eddy current—basically a deconstructed electric motor. A conductive stator is rotated in an electric field thus causing a current to flow in the stator. Current flowing in the stator (normally via a short circuit) will cause the stator to resist the rotation by creating an opposing magnetic field. The strength of this resistive force is controlled by the electric field applied across the stator. If this is done using an electro-magnet then the load can be electronically controlled. The energy is dissipated as heat in the stator due to the current flow.

The eddy current dynamometer is the most prolific due to its simplicity and low cost, but it is only suitable for relatively modest engine powers due to the difficulty of the cooling the rotating stator.

Even though the load can be electronically controlled the response time is limited due to the requirement to change the current flow through an inductive load (i.e. field coils of an electro-magnet), which is linked to changes in the magnetic field.

The time constant for this is approximately determined by the following formula;

$$t = L/R$$

(t) is the time in seconds for the current to reach 63% of its final value
(L) is the inductance in Farads
(R) is the resistance in Ohms Therefore, simple Eddy current dynamometers are best suited to steady state load operation or slow dynamic changes of the load.

For transient testing the Electric Motor/Generator and Hydraulic types are usually employed as these can support faster load changes and can additionally be used to drive the engine. These typically have response times of several milli-seconds.

SUMMARY OF THE INVENTION

The invention relates to a design for a real-time dynamometer, where the application of an electronically controlled load to the output of an electrical generator which is linked to the engine is synchronised to the engine position with respect to the combustion cycle.

According to a first aspect of the present invention there is provided a synchronous dynamometer assembly for applying a load to an engine during at least one portion of the combustion cycle of the engine in a synchronised manner so as to be repeatable for each cycle of the engine, the assembly comprising a dynamometer having a non-inductive load which, in use, is applied to the engine to vary the speed of the engine, the non-inductive load being variable by varying the current delivered to it, crankshaft monitoring means for monitoring the rotational position of the engine crankshaft, combustion detection means for detecting a combustion event in a cylinder of the engine, and control means operatively connected to the dynamometer for applying the load from the dynamometer to the engine for at least one part of the combustion cycle in real time such that the different loads may be applied to the engine for different parts of the combustion cycle.

A synchronous dynamometer assembly in accordance with the invention has the advantage that it enables the load applied to the engine to be varied in real time and with sufficient responsiveness that it can be used to control the movement of the piston during the combustion cycle and in particular, during the first 90 degrees after the combustion event in a cylinder so as to enable optimisation of the combustion efficiency. The crankshaft monitoring means enables the application of the load to be synchronised with the engine position and the combustion detection means enables the control means to synchronise the application of the load with the start of combustion.

The non-inductive load may be, for example, a resistive or capacitive load.

Preferably, the crankshaft monitoring means comprises a sensor which monitors the rotation of the crank shaft, in particular a crankshaft encoder.

The combustion detection means may comprise one or more of a cylinder pressure sensor, a crank shaft acceleration sensor, such as a crankshaft shaft encoder, a spark sensor which senses the spark of the spark plug of the engine, and a camshaft position sensor.

Preferably, the controller controls the application of the load digitally. The controller is furthermore preferably programmed to vary the load in linear steps.

The current and voltage used by the load may advantageously be monitored by the controller and the product of the two accumulated over time to record the electrical power consumed.

The engine crankshaft is preferably hard connected to a generator/alternator, either directly or via power take off (PTO) coupling. The alternator is advantageously a 3 phase alternator, which has the advantage that it will minimise output perturbation. The assembly preferably includes a bridge rectifier for rectifying the 3 phase output of the alternator so a single high voltage load can be employed. The controller is preferably then programmed to use the position of 3 phase voltage peaks in the load calculation.

In an alternative embodiment the generator is of the switched reluctance type. This has the advantage that the armature does not employ magnets or winding coils and all of the electrical circuits are located on the stator ring. This type of generator is cheap to manufacture and has a wide operating temperature range because the armature is effectively passive and all of the active circuits are located on the stator assembly. This type of generator is capable of operation over a large speed range. The output is in the form of pulses of current as the teeth on the armature pass through the magnetic field generated by the energised stator coils. This type of generator is capable of generating large bursts of current and hence torque on the crankshaft in this application.

The controller may be configured to measure the current and voltage on the load in real time and use the measurements to automatically vary the electrical load to provide closed loop control of the load, thereby enabling compensation for variations due, for example, to temperature etc.

If the dynamometer electrical load is capable of storing electrical energy, for example in a capacitor or battery then this energy may be used advantageously either contemporaneously or at a later time.

The dynamometer is advantageously utilised in the engine system in place of a conventional alternator.

The dynamometer is preferably arranged on a common axis between the combustion engine and a mechanical gearbox connected to the combustion engine.

The dynamometer is advantageously configured with means for varying its magnetic field strength in real time such that the magnetic field strength can be increased to increase the output voltage if required.

According to another aspect of the present invention, there is provided a method of a controlling the movement of a piston during the combustion cycle of an engine, comprising the steps of connection a synchronous dynamometer assembly according to the invention to the engine so as to enable a variable load to be applied to the crankshaft of the engine, monitoring the rotational position of the crankshaft, monitoring the combustion events in the engine, and varying the load delivered to the non-inductive load of the synchronous dynamometer assembly in real time, in response to the rotational position of the crankshaft and the timing of the combustion event, so as to vary the load applied to the engine at different points during the combustion cycle and thereby control the speed of movement of the piston during the combustion cycle.

Preferably, the rotational position of the crankshaft is monitored with crankshaft monitoring means which comprises a sensor which monitors the rotation of the crank shaft, in particular a crankshaft encoder.

Preferably, the combustion events are monitored by monitoring on or more of cylinder pressure, crank shaft acceleration, the spark of the spark plug of the engine, and camshaft position.

Preferably, the application of the load is controlled digitally, and the load is preferably varied in linear steps.

Preferably, the current and voltage used by the load is monitored and the product of the two accumulated over time to record the electrical power consumed.

Preferably the current and voltage on the load is measured in real time and the measurements used to automatically vary the electrical load to provide closed loop control of the load, thereby enabling compensation for variations due, for example, to temperature etc.

The response time of several micro-seconds (bandwidth of approximately 1 Mhz) allows different values of load to be applied multiple times during each combustion cycle. The purpose of which is to modify the rotational velocity of the engine within each combustion cycle.

This is necessary both for the implementation and testing of a new variant of reciprocating engine that uses an electrically controlled high speed load to reduce the acceleration of the piston after combustion to generate a period of constant volume, or pseudo constant volume combustion in order to ensure faster and more complete combustion of the fuel employed.

Applicant's own earlier international application WO2018142097 described a closed loop internal combustion system which teaches the concept of in cycle control and its extension to closed loop control using the load on the engine as the effector.

In practice, the Closed Loop Internal Combustion (CLIC) engine should be capable of real time operation. However, because of the repetitive nature of the combustion events within a reciprocating engine, the variation in combustion conditions between contiguous combustion events can be relatively modest (i.e. not full scale) and thus the control algorithm may use a predictive element based on the previous combustion events as well as a real-time element based on the current combustion event.

A further aspect of the present invention provides a CLIC engine implementation using an electrical generator and electrical load as the means of changing the load on the engine (i.e. the effector). Other electro-mechanical methods are possible within the scope of the teaching of this application but the fully electrical implementation is preferable because of the greater sophistication of the control systems that can be employed with this method.

In the system of the invention, the conventional mass of a flywheel connected to the engine is replaced with the armature of an electric generator/alternator in order to control the load on the engine.

More particularly, the present invention further provides details of control systems that can be employed for the practical application of the CLIC engine. The purpose of such a control system for the operation of the combined engine, electrical generator and electrical load in this context is to ensure safe, reliable, controlled, optimised operation for every individual combustion cycle.

There is also however, the concept of system-level control. This would be responsible for managing the power system, comprising the combustion engine, electrical generator and electrical load, to ensure that the work output was delivered in the required format. This could be as rotational mechanical energy (i.e. driven from the combustion engine crankshaft), electrical energy from the generator directly, or electrical energy from an energy storage system (i.e. battery or capacitor based). The system level control system could also be responsible for the management of multiple power systems, so that they can be combined to generate higher aggregate power outputs, or provide redundancy in the case of the failure or planned maintenance of an individual power system.

Air may be used to cool the alternator/generator during operation which can advantageously be used for heating purposes, such as for heating a passenger area of a vehicle fitted with the system of the invention.

BRIEF DESCRIPTION OF THE DRAWINGS

In order that the invention may be well understood, there will now be described an embodiment thereof, given by way of example, reference being made to the accompanying drawings, in which:

FIG. 1 is a schematic view of a control system for the invention;

FIG. 2 is a diagrammatic representation of a load switching system which may be used with the invention;

FIG. 3 is a schematic representation of an alternative, more sophisticated control system according to another embodiment of the invention;

FIG. 4 is a schematic representation of a power system which can be used in a CLIC engine according to the invention; and FIG. 5 is a schematic representation illustrating how the power system of FIG. 4 can be used as part of a modular assembly.

DETAILED DESCRIPTION OF THE PREFERRED EMBODIMENTS

The present invention provides a dynamometer controlled by an electronic control unit (ECU). The dynamometer ECU can be separate or integrated into the ECU that controls the engine. FIG. 1 shows a crankshaft angle encoder (2) with a differential output which is decoded by a differential receiver (3). The output from the differential receiver is input to the dynamometer ECU (1). The operative inputs to this are;

Engine crankshaft position
Detection of the combustion event

The crankshaft position needs to be determined to a high degree of accuracy. Typically, an angle encoder with better than 1 degree of resolution would be employed, functionally connected to the crankshaft.

The detection of the combustion event could be achieved by using one, or more of the following;

Engine cylinder pressure sensor
Spark ignition (in a gasoline engine)
Camshaft position sensor (in a four-stroke engine)
Crankshaft acceleration The output of the cylinder pressure sensor (4) is an analogue voltage which is converted to a digital word using an Analogue to digital converter (ADC) (5) before being input to the ECU.

The spark ignition sensor (6) produces a pulse output that is buffered (8) prior to being input to the ECU, for engines that utilise spark ignition.

The camshaft position sensor (7) produces a pulse that is buffered (8) prior to being input to the ECU.

It should be noted that for a simple implementation the crankshaft angle encoder (2) alone could be employed to provide both of the operative inputs, namely; the engine rotation positional and also the time of the combustion event. The latter by detecting the time that the highest frequency of encoder pulses occur, which will correspond with the maximum acceleration of the crankshaft which occurs due to the combustion event.

Following detection of the combustion event the dynamometer ECU can be programmed to apply a sequence of variable loads. The magnitude of the load, and the angular duration can be derived from algorithms or from look-up tables, or a combination of both.

It is likely in the test application that the dynamometer will be set to provide a constant baseline load to the engine. The variable, sequential load will then be applied in addition to influence the combustion process.

A digital bus output (9) from the ECU is used to control the load. Preferentially this digital bus output should be in a differential electrical format such as Low Voltage Differential Signaling (LVDS).

FIG. 2 shows that the digital bus outputs are galvanically isolated (10) from the load control circuits to protect against interference from the electrical switching noise. The local signals are used to directly control the loads using low side switches (11). Preferably, these low side switches will be implemented as Gallium Nitride Field Effect Transistors (GAN FET), or Silicon Carbide Field Effect Transistors, due to their characteristics of high speed and low power dissipation.

Each low side switch is connected to a resistive load in a bank of load resistors (13). The resistive loads are scaled by a factor of 2, so that they implement a binary encoding scheme. For example, four loads of 8, 4, 2, 1, ohms respectively, can implement 15 individual linear load steps. This can be implemented by assembling resistors (12) of the same value in parallel configurations as shown. For the example given; 15 resistors of 8 ohms each would provide the four values required.

Resistive loads are used due to their low inductance and capacitance and therefore fast switching time.

The output of an alternating current (AC) 3 phase alternator that is rectified with a bridge rectifier (14) to generate a direct current waveform (DC) which is connected to the high side of all the loads.

The total direct current (DC) to the loads is measured using an isolated current sensor (15). The total DC voltage to the loads is measured using an isolated voltage sensor (16). The current measurement value (17) is input to the dynamometer ECU via an ADC. The voltage measurement value (18) is input to the dynamometer ECU via an ADC. The EDC can additionally be employed to adjust the digital bus output code to compensate for changes in the load characteristic (e.g. over time or temperature) using these two inputs, A 3 phase AC generator is the preferred embodiment due to its simplicity and the fact that by superimposing three sine waves with a phase difference of 120 degrees between each the composite voltage output after rectification is naturally quite uniform with relatively low ripple voltage.

The dynamometer can modify the load applied to compensate for the instantaneous phase of the 3 phase AC generator. The instantaneous phase of the 3 phase AC generator can be determined by the current and voltage measurement.

The AC 3 phase generator is connected to the engine crankshaft. This can be directly, via a driveshaft or an intermediate gearbox.

The load resistors can be cooled by forced air or water cooling. The fact that they can be located remotely from the dynamometer simplifies this task. Alternative embodiments where the load resistors are replaced by rechargeable batteries, or capacitor is also envisaged. For this application, the measurement of the total current and voltage in the load will be used to control this process, to compensate for the relative non-linearity of the load compared to a purely resistive load.

In terms of a control system the following calculation illustrates the frequency response of the system.

Engine Maximum 10,000 rpm=166 Hz per revolution.

166 Hz×360 degrees per revolution=59, 760 Hz per degree

Active load response time <1 micro second=1,000,000 Hz (1 Mhz)

Therefore, the active load can switch load settings 1,000,000/59,760=16.7 times per degree of crankshaft rotation at 10,000 rpm.

The synchronous real time dynamometer employs a modular design, whereby the number of load steps can be increased by simply adding additional load switching stages, supported by additional control digit bus outputs. The load resistor values may also be changed to modify the total load.

In an alternative embodiment the synchronous dynamometer may be connected on a common drive shaft or crankshaft with the engine and standard dynamometer. This test scenario would typically be used to measure the effects of using an electrically controlled high speed load to reduce the acceleration of the piston after combustion to generate a period of constant volume, or pseudo constant volume combustion in order to ensure faster and more complete combustion of the fuel employed, in a benchmark (i.e. industry standard) test configuration, where the results for standard engines and standard dynamometers are well established and known.

Referring now to FIG. 3, there is shown a diagrammatic representation of an alternative control system of the invention.

FIG. 3 shows engine cylinder 21 which includes an in-cylinder pressure sensor 24 which is used to measure the cylinder pressure inside the engine cylinder 21 in real time. These tend to be piezo resistive based devices. Thus, the electrical charge generated is proportional to the cylinder pressure. This electric charge is converted to a voltage by an amplifier stage 25 prior to use by the control system 35. The control system processing is implemented using algorithms in a Field Programmable Gate Array (FPGA) or microprocessor. These systems require that the voltage from the pressure sensor is converted into a digital representation using a high speed analogue to digital converter 27, commonly known as an ADC.

A crankshaft angle sensor 23 is used to determine the position of the crankshaft relative to the engine cylinder. This type of sensor normally generates a pulse train as the teeth on flywheel 22 attached to the crankshaft rotates past the sensor. In the system of the present invention, a minimum resolution of 1 pulse per degree is required. This is approximately 10× greater than required for a conventional combustion engine. The pulse train from the sensor may require signal conditioning 26 to generate a digital pulse train for control system processor 35.

The crankshaft angle is used to calculate the instantaneous cylinder volume since both the bore size and stroke characteristics of the engine will be known, which are fixed for a particular engine. The measured cylinder pressure and the derived measurement of cylinder volume are used to calculate the temperature of the combustion gases in the engine cylinder using the gas laws.

The cylinder pressure measurement is used primarily in three key calculations as follows;

Firstly, the cylinder pressure measurement is used to determine when combustion has started and thus when the electrical engine load can start to be applied to the combustion engine.

Secondly, the cylinder pressure measurement is used continuously in the calculation of the temperature of the combustion gases.

Thirdly, the cylinder pressure measurement is used to determine when the required pressure or (via calculation) temperature in the engine cylinder has been reached (normally for optimised combustion) and therefore when the electrical engine load should be removed from the combustion engine.

Since the optimised combustion in a CLIC engine is very fast, the timing of the removal or reduction of the electrical engine load is critical to avoid an over pressure condition in the engine cylinder which could damage the engine. Therefore, a software controlled hardware switching implementation as shown in FIG. 3 is proposed for this function.

The system controller 35 generates a digital bus signal to a digital to analogue converter 29. The voltage output of the digital to analogue converter is applied to a comparator 34. The other input to the comparator is the live voltage derived from the pressure sensor. The comparator generates a signal that disables the electronic load switching circuit (31), and thus removes the electronic load at the end of the operation.

In a similar fashion a duplicate circuit can be used to enable the electronic load at the start of the operation using comparator 28.

These circuits operate by using the live pressure value to avoid or reduce the processing delay associated with ADC conversion and processing of the pressure signal by the control loop in the system controller and thus facilitate real time operation.

The system controller sets the required value of the electronic load using a digital bus output 30.

An interlock can be provided by setting this value to zero, based on the duration of the time that the electronic load has been applied for relative to the rpm of the combustion engine. The timer would use the number of crank angle pulses received. This function would use the feedback from the enable 28 and disable 34 comparators to enable and disable the timer respectively.

The software output used to set the switching condition should be based on the rate of increase of cylinder pressure in addition to the current cylinder pressure.

For functional safety, it is recommended that an independent switching circuit is employed that uses a fixed value for maximum cylinder pressure to disable the electrical engine load under fault conditions.

For functional safety, it is also recommended that an independent timer is implemented that limits the maximum number of degrees of engine crank angle during which the electrical engine load can be applied.

The pressure sensor can also be used at other times as well as during combustion to determine the operational efficiency and condition of the engine to detect wear and faults during lifetime monitoring.

The timings of these switching events can be advanced in time to compensate for latency in the electrical switching systems.

A standard engine driven Alternating Current (AC) electrical generator is designed for steady state operation, typically operating at a fixed rpm, producing approximately constant output voltage at a constant frequency for constant output currents.

The electrical generator required the CLIC engine application needs to be optimised for transient operation. A response time of less than 1 milli-second is required. When the electrical engine load is applied, this connects the output of the electrical generator to the electrical load. This will cause electrical current to flow from the generator into the load. The rate of change of current will be limited by the inductance of the electrical circuit. The primary contributor to the inductance of the circuit is the output coils of the electrical generator.

It is a requirement that the output coils are low inductance and if multiple coils are used, that these are connected in parallel to minimise the overall inductance. The wire used in the windings should also have low resistance to minimise losses due to heating in the windings.

The electrical generator for the CLIC engine application should be of the 3 phase AC type. This ensures that when the 3 phases are combined electrically, the overlap of the voltage waveforms ensures that there is a relatively small variation in total output voltage (voltage ripple) with the rotational position of the generator. Additional phase windings (i.e. more than 3 phases) may reduce the voltage variation further.

An alternative embodiment using a Switched Reluctance Generator (SRG) may be more cost effective than an AC generator but with potentially higher variation in the output voltage and current.

For similar reasons a 48V based system could be employed, although the currents would be higher.

The generator should be functionally connected to the crankshaft in a locked relationship. This can be directly or via a gearbox. FIG. 4 shows the electrical generator 38 directly connected to the crankshaft 40 from the combustion engine 36.

An electrical generator works by moving a conductor through a magnetic field. This generates a current according to the electromagnetic laws of induction. There are several standard motor configurations in common use. For the CLIC application it is a requirement that the generation of the output current creates a high torque loading on the crankshaft. This is necessary to reduce the rate of acceleration of the crankshaft during the combustion cycle, without requiring excessive electrical output current to be drawn. This can best be satisfied using a generator configuration as shown in FIG. 4. This configuration is common in motors, known as pancake motors, but rare for generators. FIG. 4 shows the internal view 45 of the electrical generator 37 and it can be seen that the magnetic circuit 43 is located around the edge of a large diameter armature 44. The diameter of the armature 41 is much greater than the length of the generator 42.

The torque on the crankshaft when electrical power is being generated and used is therefore proportional to the radius of the armature. In an alternative configuration, an armature fixed to the crankshaft could be used to replace the flywheel of a combustion engine. It would also be cost effective to integrate the high precision crankshaft angle sensor with the armature assembly.

In a preferred embodiment the CLIC engine pancake generator should be installed between the combustion engine and the mechanical gearbox.

The armature assembly should include an integral cooling mechanism. Fan blades on the armature should draw cold air in and over the field and output coils to cool them. The resultant hot exhaust air from the assembly can be ducted and used directly in the heating system for the vehicle. The advantages are that the air is clean (i.e. not exposed to the engine, or exhaust system) and is available immediately that the field coils are energised, or the engine started. This removes the need for connecting the vehicles fluid based cooling circuit to the vehicle cabin and provides a significant simplification and cost saving.

The magnetic field in standard generators can be created using permanent magnets or more commonly with field coils. The latter are basically electro-magnets, whereby electrical current flowing in the field coils generates the magnetic field. The current flowing in the field coils can be controlled to regulate the magnetic field and hence the output of the generator. This is typically used to maintain an approximately constant voltage output from the generator, when the output load changes, or if the generator speed changes.

The field coils or permanent magnets are typically mounted on the armature in a pancake generator.

For the CLIC electrical generator the output voltage should scale with engine rpm. This is because at higher rpm less time is available to reduce the acceleration of the crankshaft. Therefore, increasing the generator output voltage will also increase the output current automatically. This is true for the steady state current value, but critically also for the state where the rate of change of current is limited by the output coil inductance of the generator.

Additionally, increasing the voltage and hence current to the field coils will increase the magnetic field generated and hence the voltage and hence current available from the output coils, for any operational state. This technique can also be used to increase the generator output voltage to increase the output current when the rate of change is limited by the output coil inductance of the generator.

It can be seen that, by both the variation of generator output voltage and by variation of the magnetic field in the generator it is possible to minimise the restrictive effect of the inductance of the output coils of the generator, by increasing the applied voltage. This allows faster changes in electrical load current which corresponds to a faster system response time. The control of the generator magnetic field may be fully automatic, for example directly related to engine rpm, or can be controlled on demand, for example by the CLIC engine control system. Controlling on demand would allow this technique to be employed at constant rpm. This would allow the generator output voltage to be boosted just prior to the application of the electrical load to increase the rate of change of current in the electrical load and hence the response time of the system. The control algorithm for this could be either real time, based on live measurements, or predictive based on the results of the previous combustion event, or a combination of both.

It is implicit that electrical generator in the CLIC engine power system would replace the alternator currently employed on combustion engines.

The generator could also be configured as a motor. This could be accomplished using electrical switching circuits to reconfigure the electrical arrangement, for example by switching the connectivity and hence the direction of current flow in the output coils. It could also be accomplished using additional dedicated windings on the generator. It would be possible therefore, to operate the generator as an electric motor to provide electric drive (either as a traction motor to the drive system of the vehicle, or as kinetic energy to the combustion engine during the non-combustion cycles of the engine). It would also be possible to operate the generator as an electric motor to replace the starter motor function of the combustion engine.

A digitally controlled, scalable electrical load is required for the CLIC engine application. This is shown as 39 in FIG. 4 and is electrically connected to the output from the electrical generator. The scalability determines how much electrical power the electrical load draws from the generator.

Power=Volts×Amps

The applied electrical load should be proportional to the generator output voltage. The load setting will therefore track variations in the generator output voltage due to rpm, or the variation on the AC voltage waveform (i.e. ripple which is related to generator rotational position) at the time the electrical load is applied.

Preferably the 3 phase output from the generator should be combined using a full bridge rectifier to generate a DC base voltage with superimposed ripple voltage (unregulated).

The capacitive reactance of the electrical load ($Xc=1/2\pi FC$) should equal the reactive inductance of the generator output coils ($Xl=2\pi FL$) to maximise the power transfer at a common operational point.

The instantaneous power consumed in the electrical load is measured and fed back to the CLIC engine control system. This allows the load setting to be calibrated and for diagnosis of any fault conditions. This is shown in FIG. 3, whereby the load voltage 32 is connected to the controller 35 via an ADC 27. A duplicate circuit is provided for the load current 33 measurement.

The electrical load preferably also provides electrical energy storage, for example, using batteries or high voltage capacitors. The temperature of the electronic load is monitored.

When the CLIC engine is operated with an electronic load that can store electrical energy, it is possible to control what proportion of the work output is stored as electrical energy. The work output is derived from the fuel employed in the combustion engine.

If the electrical energy storage is implemented primarily using rechargeable batteries, it would be possible to operate the CLIC engine to ensure that these were fully charged at some future point in time. A typical application would be on a hybrid vehicle traveling towards a zero emission zone. Integration with the navigation and traffic systems could ensure that the vehicle had sufficient stored charge to run solely on battery power (CLIC engine off) once inside the zero emission zone.

If the CLIC engine was used in a stand alone electrical generator scenario then the majority of the work output of the combustion engine would be made available as electrical energy, with a minimum retained for the kinetic energy required for the operation of the combustion engine.

If the electrical energy storage was implemented primarily using high voltage capacitors then a low cost electric drive system could be implemented. The capacitors would need to store sufficient energy to drive the electric motors used for traction between recharge cycles from the CLIC engine, or a plurality of CLIC engines. In this scenario, the voltage of the energy storage capacitors would be the primary input to the CLIC engine control system. Therefore, the CLIC engine would be a slave system and the engine speed (rpm), amount of fuel employed would be controlled automatically to maintain the capacitor voltage within an acceptable range. If the energy drawn from the storage capacitors changed then the resultant change in voltage would cause the CLIC engine control system to compensate. If the change were instigated by a demand, such as throttle pedal, then the CLIC engine control system could anticipate the demand and increase the combustion engine output before the capacitor voltage reduces.

High voltage, high value capacitors are readily available as they are used in electrical machines. They are cheaper and simpler to manufacture in volume and do not have the life, toxicity and raw material issues associated with rechargeable batteries.

With an electric drive system, it would also be possible to operate the combustion engine at constant rpm and change the fueling to vary the work output harvested as electrical energy. This would allow the combustion engine to be operated at an optimal rpm. This would require electrical energy storage as the combustion engine has a relatively slow transient response and could not respond to real time demands instantaneously.

The CLIC engine is effectively a power system comprising, combustion engine, electrical generator and electrical load. The combustion engine is envisaged to be a single cylinder design (although multi cylinder designs are possible) to minimise weight and production cost. The electrical generator is matched to the maximum power output of the combustion engine.

In the preferred embodiment, the CLIC engine power system has a modular design such that multiple power system modules can be combined together to realise high aggregate power outputs. This is a very flexible and cost effective way of achieving this as the modular design is produced in high volumes. There are also benefits in terms of reliability and ease of maintenance as the failure or replacement of one module does not stop the aggregate system from working. Moreover, there are benefits in load sharing, thus leveling the wear across all modules (modules can be powered down in rotation) if the maximum output power is not regularly used.

FIG. 5 shows two modular power systems (52) and (53), that each have individual electrical loads (50) and (51) respectively. The electrical outputs of these two systems is combined electrically using a diode or transistor (55) configuration into a common electrical load (56). The electrical outputs of the individual modular power systems or the combined load can be used to drive a motor (54).

With this architecture it is possible to use distributed electrical loads and energy storage components. It is also possible to use a combination of stored energy and energy generated contemporaneously (i.e. in real time) to provide the work output of the system.

What is claimed is:

1. A method of a controlling a movement of a piston during a combustion cycle of an engine, comprising the steps of:

connecting a synchronous dynamometer assembly to the engine so as to enable a variable load to be applied to a crankshaft of the engine, the synchronous dynamometer assembly comprising a dynamometer which connects to the engine through an electrical generator, the dynamometer having a variable non-inductive electrical load which can be applied to an output of an electrical generator to vary a speed of the engine, crankshaft monitoring means for monitoring a rotational position of the engine crankshaft, combustion detection means for detecting a combustion event in a cylinder of the engine, and control means operatively connected to the dynamometer for applying the variable non-inductive electrical load to the output of the electrical generator for at least one part of the combustion cycle in real time such that the variable non-inductive electrical load is variable for different parts of the combustion cycle;

monitoring the rotational position of the crankshaft;

monitoring the combustion events in the engine;

varying the variable non-inductive electrical load applied by the synchronous dynamometer to the output of the electrical generator in real time, in response to the rotational position of the crankshaft and a timing of the combustion event, so as to vary the load applied to the engine at different points during the combustion cycle and thereby control a speed of movement of the piston during the combustion cycle, wherein the combustion events are monitored by monitoring cylinder pressure using a cylinder pressure sensor;

calculating an in-cylinder temperature using the monitored cylinder pressure and the rotational position of the crankshaft which tracks a volume of the cylinder; and removing the variable non-inductive electrical load when at least one of a target cylinder pressure or a target cylinder temperature is reached during the combustion process.

2. The method according to claim 1, wherein the crankshaft monitoring step further includes monitoring the rotational position of the crankshaft with a sensor which has a resolution of at least one degree.

3. The method according to claim 1, wherein the combustion events are monitored by monitoring one or more of cylinder pressure, crank shaft acceleration, a spark of the spark plug of the engine, and camshaft position.

4. The method according to claim 1, wherein the variable non-inductive electrical load is applied after a start of combustion.

5. The method according to claim 1, further comprising monitoring a current and a voltage used by the variable non-inductive electrical load, calculating the product of the two, and accumulating the product over time to record the electrical power consumed.

6. The method according to claim 1, further comprising measuring a current and a voltage on the variable non-inductive electrical load in real time to provide measurements to automatically vary the variable non-inductive electrical load to provide closed loop control of the variable non-inductive electrical load to provide compensation for temperature variations.

7. The method according to claim 1, further comprising varying a fueling of the combustion engine to match the electrical power output of the electrical generator connected to the engine in order to maintain substantially constant rpm in the engine.

8. The method according to claim 1, further comprising storing electrical energy from a power system in an electrical energy storage system, and varying the rpm and work output of the engine based on a magnitude of the stored electrical energy.

9. The method according to claim 1, further including the steps of:

operating a modular power system comprising a plurality of power systems connected together to combine a power output of each power system, each power system comprising the engine having the synchronous dynamometer assembly for applying a load to the engine during at least one portion of the combustion cycle of the engine in a synchronized manner so as to be repeatable each cycle of the engine; and controlling the plurality of power systems in order to minimize a voltage ripple on a combined electrical output.

10. The method according to claim 9, further comprising controlling the plurality of systems in order to manage a wear on each individual unit.

11. The method according to claim 9, further comprising storing energy from the plurality of power systems in a shared electrical energy storage system.

12. The method according to claim 11, further comprising storing a majority of the electrical energy in capacitors.

13. The method according to claim 9, further comprising mechanically locking together one electrical generator and one combustion engine.

14. The method according to claim 9, further comprising matching a maximum power output of each electrical generator to a maximum power output of its connected engine.

15. A synchronous dynamometer assembly for applying a load to an engine during at least one portion of a combustion cycle of the engine in a synchronized manner so as to be repeatable each cycle of the engine comprising:

a dynamometer which connects to the engine through an electrical armature, the dynamometer having a variable non-inductive electrical load which, in use, is applied to an output of the electrical armature to vary a speed of the engine;

crankshaft monitoring means for monitoring a rotational position of an engine crankshaft;

combustion detection means for detecting a combustion event in a cylinder of the engine; and control means operatively connected to the dynamometer for applying the variable non-inductive electrical load from the dynamometer to the electrical armature so as to apply a load to the engine for at least one part of the combustion cycle in real time in response to the rotational position of the engine crankshaft and the timing of the combustion event such that the load applied to the engine by the electrical armature is variable for different parts of the combustion cycle, said control means being configured to apply the variable non-inductive load to the electrical armature and thereby control the load applied to the engine crankshaft of the engine and thereby control a speed of movement of a piston during the combustion cycle.

16. The synchronous dynamometer assembly according to claim 15, wherein the variable non-inductive electrical load is one of a resistive load or a capacitive load.

17. The synchronous dynamometer assembly according to claim 15, wherein the crankshaft monitoring means comprises a sensor having a resolution of at least one degree which monitors the rotation of the crank shaft.

18. The synchronous dynamometer assembly according to claim 15, wherein the combustion detection means comprises at least one of a cylinder pressure sensor, a crank shaft acceleration sensor, a spark sensor which senses the spark of the spark plug of the engine, or a camshaft position sensor.

19. The synchronous dynamometer assembly according claim 15, wherein a current and a voltage used by the variable non-inductive electrical load is monitored by the controller and the product of the two accumulated over time to record the electrical power consumed.

20. The synchronous dynamometer assembly according to claim 15, further including a 3 phase alternator, wherein the electrical armature is part of the 3 phase alternator, and the engine crankshaft is hard connected to the 3 phase alternator.

21. The synchronous dynamometer assembly according to claim 20, wherein a transient response time of the 3 phase alternator is greater than 1 Khz, such that it changes from 10% to 90% of a maximum rated load current the 3 phase alternator into an ideal load within 1 milli-second.

22. The synchronous dynamometer assembly according to claim 15, further including a pancake electrical generator having its magnetic circuit located at the end of the electrical armature whose diameter is much larger than the length of the dynamometer.

23. The synchronous dynamometer assembly according to claim 22, wherein a transient response time of the pancake electrical generator is greater than 1 Khz, such that it changes from 10% to 90% of a maximum rated load current of the pancake electrical generator into an ideal load within 1 milli-second.

24. The synchronous dynamometer assembly according to claim 15, further including a power system comprising the engine having the synchronous dynamometer assembly, connected thereto as an electrical generator and the variable non-inductive electrical load, wherein the electrical armature is part of the electrical generator.

25. The synchronous dynamometer assembly according to claim 24, wherein the engine and the generator are locked together.

26. The synchronous dynamometer assembly according to claim 24, wherein a maximum electrical power output of the electrical generator is matched to a maximum power output of the engine.

27. The synchronous dynamometer assembly according to claim 24, in which a plurality of power systems are connected together in a modular arrangement so as to combine a power output of the individual power systems.

28. The synchronous dynamometer assembly according to claim 27, further including a common, shared electrical energy storage system, wherein a work output of the individual power systems are combined electrically and wherein the common, shared electrical energy storage system is connected to the plurality of power systems.

29. The synchronous dynamometer assembly according to claim 28, further including one or more capacitors, wherein a majority of the electrical energy is stored in the storage system in the one or more capacitors.

30. The synchronous dynamometer assembly according to claim 15, further including a modular power system comprising a plurality of power systems connected together to combine a power output of each power system, each power system comprising the engine having the synchronous dynamometer assembly connected thereto as an electrical generator, wherein the electrical armature is part of the electrical generator.

* * * * *